United States Patent

Pinschmidt et al.

[11] Patent Number: 6,142,276
[45] Date of Patent: Nov. 7, 2000

[54] HOUSING FOR A MULTIPLATE CLUTCH

[75] Inventors: Udo Pinschmidt, Cölbe-Schönstadt; Thomas Rudolf, Dettelbach; Werner Selzam, Wipfeld; Horst Friedrich, Aidhausen/Happertshausen; Claus Orth, Mönchstockheim; Klaus Hofmann, Leutershausen, all of Germany

[73] Assignee: Sachs Race Engineering GmbH, Schweinfurt, Germany

[21] Appl. No.: 09/334,382

[22] Filed: Jun. 16, 1999

[30] Foreign Application Priority Data

Jun. 19, 1998 [DE] Germany .......................... 198 27 339

[51] Int. Cl.⁷ .................................................. F16D 11/00
[52] U.S. Cl. .................................. 192/30 W; 192/30 W; 192/111 A; 192/70.12; 29/407.1
[58] Field of Search ............... 192/70.27, 70.12, 192/113.26, 30 W; 29/407.1

[56] References Cited

U.S. PATENT DOCUMENTS

| | | |
|---|---|---|
| 1,742,805 | 1/1930 | Carhart . |
| 3,869,258 | 3/1975 | Scott ........................................ 29/156.8 |
| 5,388,474 | 2/1995 | Tanaka et al. ............................ 74/434 |
| 5,638,932 | 6/1997 | Mizukami ............................. 192/70.12 |
| 5,732,810 | 3/1998 | Schulz-Andres ...................... 192/70.27 |
| 5,962,551 | 10/1999 | Kobayashi et al. ..................... 523/153 |

FOREIGN PATENT DOCUMENTS

| | | | |
|---|---|---|---|
| 0208400 | 5/1986 | European Pat. Off. ............ 192/70.12 |
| 2 305 223 | 4/1997 | European Pat. Off. ........ F16D 13/00 |
| 0 770 788 A1 | 5/1997 | European Pat. Off. ........ F16D 13/58 |
| 2 307 958 | 6/1997 | European Pat. Off. ........ F16D 13/71 |
| 2 330 385 | 4/1999 | European Pat. Off. ........ F16D 13/72 |
| 1123 567 | 2/1962 | Germany . |
| 2513595 B2 | 10/1976 | Germany ....................... F16D 13/52 |
| 3702884 C1 | 5/1988 | Germany ....................... F16D 13/50 |
| 4406292 A1 | 10/1994 | Germany ....................... G01M 1/36 |
| 195 45 972 | 6/1997 | Germany ....................... F16D 13/60 |
| 19545972 A1 | 6/1997 | Germany ....................... F16D 13/60 |
| 19620718 C1 | 10/1997 | Germany ....................... F16D 13/68 |
| 19616329 A1 | 11/1997 | Germany ....................... F16D 13/60 |
| 19723104 A1 | 12/1997 | Germany ....................... F16D 13/60 |
| 60-53224 | 3/1985 | Japan ............................. F16D 13/71 |
| 6-74251 | 3/1994 | Japan ............................. F16D 13/60 |
| 9-177821 | 7/1997 | Japan ............................. F16D 13/70 |
| 9-310725 | 12/1997 | Japan ............................. F16D 13/60 |
| 10-213222 | 8/1998 | Japan ............................. F16D 63/30 |
| 10-213222 | 11/1998 | Japan ............................. F16H 63/30 |

*Primary Examiner*—Rodney H. Bonck
*Assistant Examiner*—Tisha D. Waddell
*Attorney, Agent, or Firm*—Cohen, Pontani, Lieberman & Pavane

[57] ABSTRACT

A housing for a multiplate clutch includes a toothed ring having a plurality of multiplate driver teeth arranged on an inner peripheral surface thereof distributed in the peripheral direction, and extending in a ring longitudinal direction. A flywheel disk is connected to the toothed ring at a first end of the same for common rotation. A cover is connected to the toothed ring at a second end of the same for common rotation. In this case, the toothed ring is connected to the flywheel disk by welding.

17 Claims, 5 Drawing Sheets

HOUSING FOR A MULTIPLATE CLUTCH

BACKGROUND OF THE INVENTION

1. Field of the Invention

The present invention relates to a clutch housing for a motor vehicle and more particularly, it relates to a housing for a multiplate clutch.

2. Description of the Related Art

A multiplate clutch housing is disclosed, for example, by DE 195 45 972 A1. In a known multiplate clutch of this type, the housing, that is to say the flywheel disk, the toothed ring and the cover, are held together by bolts which pass axially through these three components. The bolts are respectively guided in openings which pass through the multiplate driver teeth and corresponding openings in the flywheel disk and the cover.

Multiplate clutches of this type are generally used in the motorsport sector, and it is an objective to design these clutches to have the lowest possible weight and the lowest possible moment of inertia. However, this requirement runs contrary to holding the components forming the housing together by means of a plurality of bolts, since, on the one hand, in order to provide the desired stable holding together, these bolts have to be constructed very solidly and, on the other hand, are positioned in radially outer regions of the housing, so that they significantly contribute to the moment of inertia of such clutches.

SUMMARY OF THE INVENTION

It is therefore an object of the present invention to provide a housing for a multiplate clutch which can be assembled in a simple way and can be provided with the lowest possible mass, i.e., the lowest possible moment of inertia.

According to the invention, this object is achieved by a housing for a motor vehicle multiplate clutch, comprising: a toothed ring having a plurality of multiplate driver teeth which are arranged on an inner peripheral surface of said ring, distributed in the peripheral direction, and extending in a ring longitudinal direction; a flywheel disk, which is connected to the toothed ring at a first end of the same for common rotation; and a cover connected to the toothed ring at a second end of the same for common rotation.

In the housing according to the invention, provision is made for the flywheel disk and/or the cover to be connected to the toothed ring by welding, preferably electron beam welding or laser welding.

Using a construction of this type, it is possible to dispense completely with the provision of any bolts for connecting the individual housing components. This reduces the mass and thus the moment of inertia of the housing considerably according to the invention, and also contributes to a distinct reduction in manufacturing costs, since the bolts used in the prior art for holding the housing together were generally designed as reduced-shank bolts, and had to be produced with high precision and were thus expensive.

In the housing according to the invention, the connection stability can be improved further if the flywheel disk and/or the cover and the toothed ring are connected to one another by welding essentially over the entire peripheral area. This further contributes to the stiffening of the toothed ring.

In order to obtain the best possible connection stability, it is proposed that the flywheel disk or, respectively, the cover and the toothed ring be formed of the same material.

Because of the requirement to use the lightest possible components in the motorsport sector, it is proposed that the flywheel disk or, respectively, the cover and the toothed ring be made of titanium material.

In order to be able to reduce the weight and thus the moment of inertia further in the housing according to the invention, it is proposed that at least one, and preferably all, of the multiplate driver teeth have a cutout which penetrates said teeth in the ring longitudinal direction.

At the same time, in order to provide an enhanced ventilation effect for a clutch equipped with a housing according to the invention, and for the purpose of improved heat dissipation, it is proposed that the cutout be open radially to the outside and/or radially to the inside.

An increase in the stability and a simplification in the manufacturing process can be obtained if the flywheel disk or the cover is fitted into the toothed ring, and an outer peripheral surface in the area of said disk or cover is welded to an inner peripheral surface of the toothed ring.

In rotating systems, such as for example the drive system of a vehicle, it is necessary to record the rotational speed. This is generally achieved by providing a signal-generating ring on one of the rotating components which has one or a plurality of signal-generating projections which generates a pulse as it moves past a signal-generating unit, generally a signal-generating coil, so that the rotational speed can be inferred from the number of pulses generated per unit time. In order to integrate this signal-generating function into a multiplate clutch, according to a further aspect of the present invention, if desired in conjunction with the aspect described above, provision is made for the housing to further comprise a signal-generating ring. The signal-generating ring is held on the housing between the toothed ring and the flywheel disk or the cover. It is thus not necessary for any additional measures, such as fixing screws or the like, to be taken in order to integrate a signal-generating ring of this type into the rotating system.

To this end, provision may be made, for example, for the signal-generating ring to have at least one securing projection which projects radially inward and which engages in a securing cutout which is provided on the toothed ring and is preferably open axially. In this case, the securing cutout can be aligned in the peripheral direction with a multiplate driver tooth, and the at least one securing projection may essentially have a contour which is matched to the tooth contour.

Furthermore, it is possible for the securing cutout to be aligned in the peripheral direction with a multiplate driver tooth and to extend into the multiplate driver tooth. The securing projection includes a contour which corresponds to the cutout contour produced in the multiplate driver tooth.

In particular when connecting the toothed ring and the flywheel disk or, respectively, the cover by welding, it is advantageous if the welded connection between the toothed ring and the flywheel disk or, respectively, the cover is interrupted in the area of the securing cutout, and a relief hole cutting into the welded connection is provided at least one end of the welded connection. It is thus possible to avoid notch stresses being produced during operation in this end region of a welded seam.

The signal-generating ring is preferably fitted onto an outer peripheral surface of the toothed ring and is preferably composed of a material that differs from that of the toothed ring and the flywheel disk or, respectively, the cover.

In order to be able to produce signals by electromagnetic induction, it is proposed that the signal-generating ring be formed of magnetic material.

The present invention further relates to a method of producing a housing of a multiplate clutch, comprising connecting a toothed ring to a flywheel disk and/or a cover by welding, and preferably by electron beam or laser welding.

In this method, before these components are welded, provision may be made for a signal-generating ring to be arranged between the toothed ring and the flywheel disk or the cover and only then for the welded connection operation to be performed.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is described in detail below with reference to the appended drawings and using preferred embodiments. In the drawings.

DETAILED DESCRIPTION OF THE PRESENTLY PREFERRED EMBODIMENTS

Figure 9:
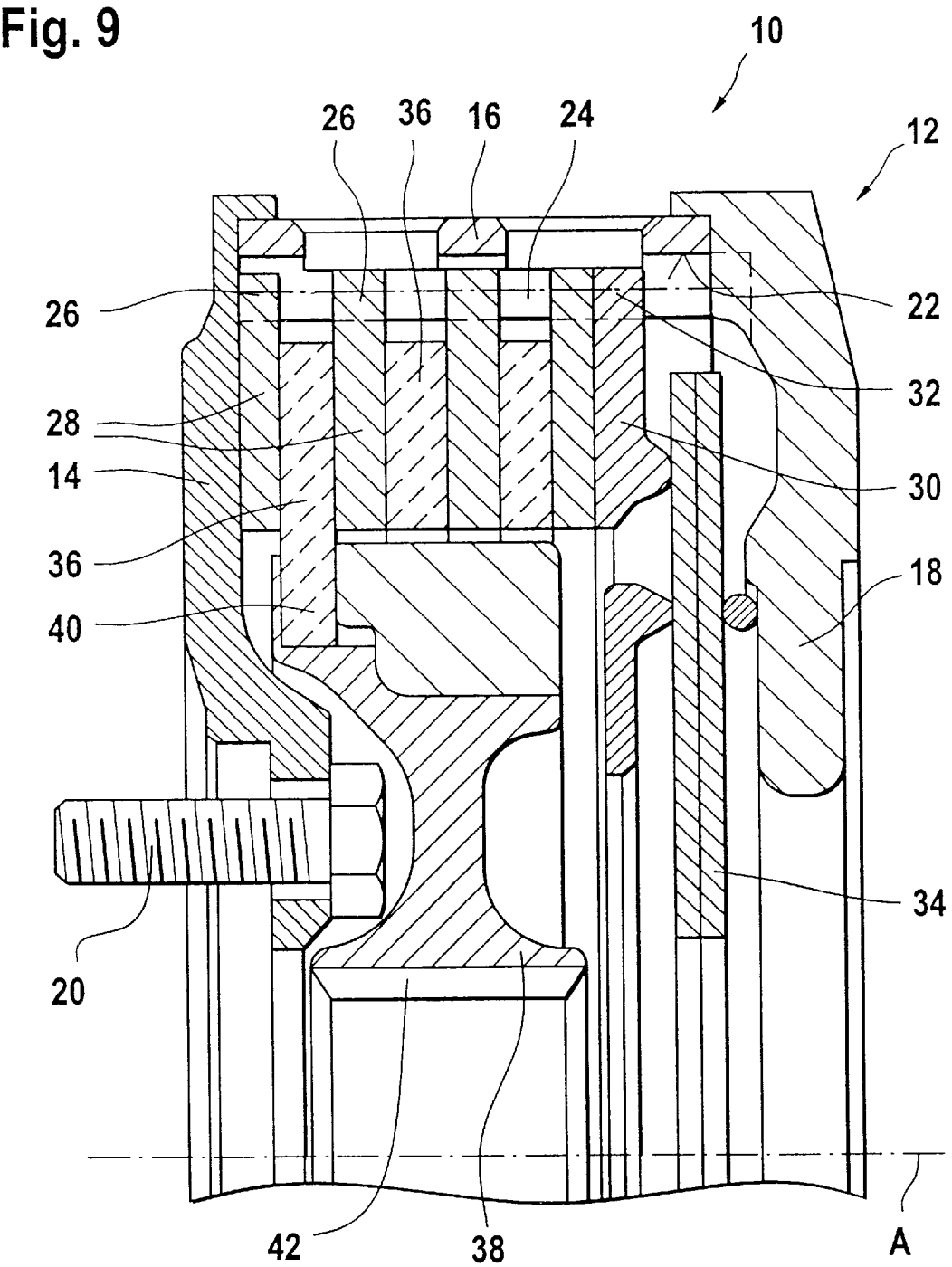
FIG. 9 is a partial longitudinal sectional view which shows the general construction of a multiplate clutch.

Before the details of the present invention are discussed, the construction of a multiplate clutch will be described in general terms with reference to FIG. 9.

A multiplate clutch 10 comprises a housing, designated generally by 12, formed of a flywheel disk 14, a toothed ring 16 and a cover 18. The flywheel disk 14 can be screwed onto a drive shaft, for example a crankshaft of an internal combustion engine, by means of a plurality of bolts 20, so that the housing 12 will rotate about an axis of rotation A, driven by this drive shaft, after it has been integrated into the drive system.

The toothed ring 16 has a plurality of multiplate driver teeth 24 which are arranged on an inner peripheral surface 22 of said ring, distributed in the peripheral direction, and extend in a ring longitudinal direction which corresponds to the direction in which the axis A extends. Respective outer teeth 26 of outer plates 28, of which four can be seen in FIG. 9, engage in the multiplate driver teeth 24. These outer plates 28 are thus connected so that they rotate with the housing 12 but can be displaced in the axial direction with respect to the housing. Furthermore, a pressure plate 30 is connected, via corresponding external toothing 32, to the housing 12 so that it rotates with it but can be displaced in the axial direction. Between the pressure plate 30 and the cover 18 there acts an energy storage means, here in the form of a diaphragm spring 34, which is held on the cover 18 in a known way via spacer bolts (not illustrated). The diaphragm spring 34 presses on the pressure plate 30 in its radially outer area, so that said pressure plate 30 in turn presses the outer plates 28 together with inner plates 36 respectively arranged between the outer plates, in the direction of the flywheel disk 14. As a result of this pressing action, a torque transmitting connection is produced between the outer plates 26, which are connected to the housing 12 so that they rotate with it, and the inner plates 36, which are connected to a hub 38 so that they rotate with it. For this purpose, each of the inner plates 36 has inner toothing 40 which engages in corresponding outer toothing on the hub 38. The hub 38 also has inner toothing 42, with which said hub can be brought into rotary engagement with a clutch output shaft, in general a gearbox input shaft.

The above-described construction of the multiplate clutch 10 is generally known, and it should be pointed out that a large number of modifications can be undertaken on this construction with regard to its configuration, e.g., the number and positioning of the individual components, especially the outer or, respectively, inner plates, the configuration of the energy storage means and so on. The principles of the present invention can be applied irrespective of the variation of the multiplate clutch in these areas.

Figure 1:
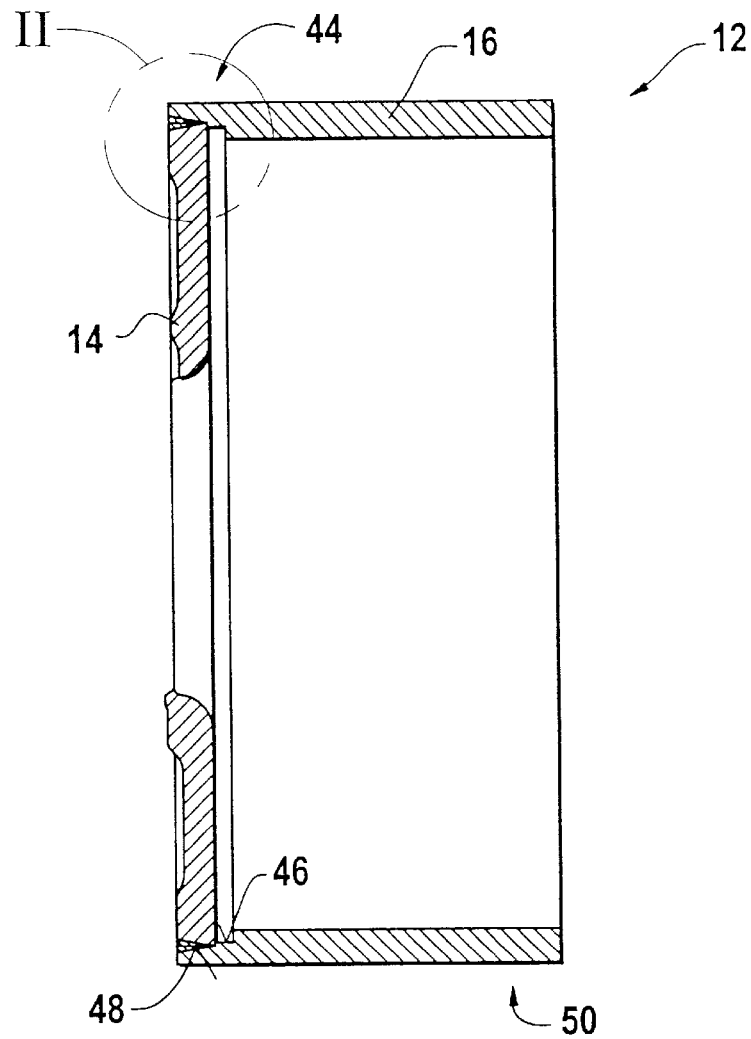
FIG. 1 is a longitudinal sectional view of a housing according to the invention which shows the connection of a toothed ring to a flywheel disk.
Figure 2:
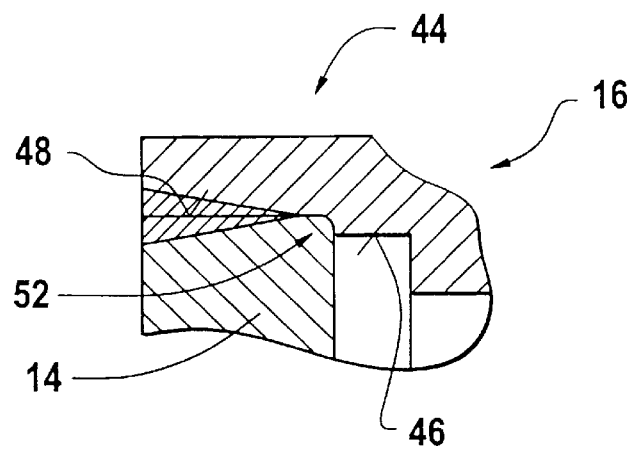
FIG. 2 is an enlarged detailed view of the section in FIG. 1 contained within the circle II.

In the present invention, provision is made for the flywheel disk 14 and the toothed ring 16 to be connected to each other by a welding method. It can be seen in FIG. 1 that, for this purpose, the toothed ring 16 is designed such that its first axial end 44, which is to be connected to the flywheel disk 14, is configured to have an inner peripheral cutout 46, into which the flywheel disk 14 is fitted, so that the flywheel disk rests with an outer peripheral surface 48 on the toothed ring 16. At the same time, a radial shoulder 52 (FIG. 2) is formed in the area of the cutout 46 and provides an axial stop for the flywheel disk 14 and thus very precise positioning for this component on the toothed ring 16.

Electron beam welding or laser welding is then carried out in the area of these surface regions which rest on one another, so that these two components are firmly connected to each other. In order to make welding possible, both components are preferably produced from titanium, for example TiAl6V4, so that in addition to the high welding stability, a saving in weight is achieved by using a lightweight material. It is thus possible to dispense with the use of bolts for connecting these components, which, on the one hand, contributes to a reduction in the mass and thus in the moment of inertia and, on the other hand, considerably reduces the production costs. Furthermore, by means of the welded connection which runs around in the peripheral direction, an increased connection stability and, in addition, a stiffening of the housing 12 in the area of the toothed ring 16 are obtained.

It should be pointed out that, instead of the welded connection to the flywheel disk 14, the toothed ring 16 could be connected at its second axial end 50 to the cover in a corresponding way by welding. However, since the housing 12 is accessible from the side of the cover the welded connection to the flywheel disk 14 is preferred. In addition, following the integration of a housing of this type or, respectively, of a clutch equipped with such a housing, into a drive system, that is to say after the flywheel disk 14 has been screwed to a drive shaft, maintenance or replacement work can be carried out simply from the gearbox side.

Figure 3:
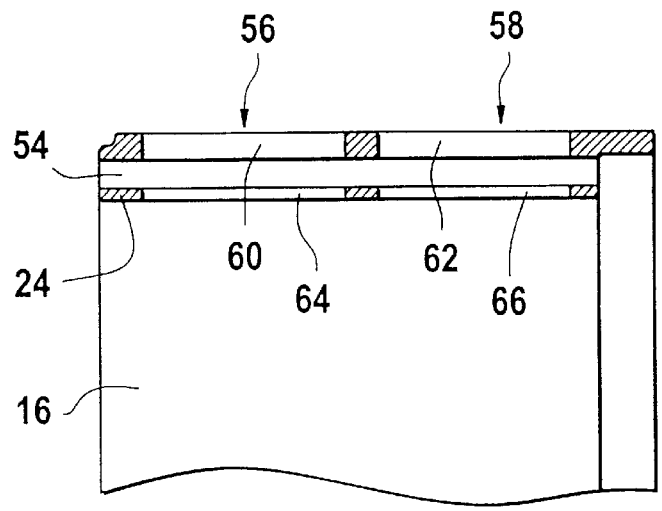
FIG. 3 is a partial longitudinal sectional view of the toothed ring, cut away in the area of one of the teeth.
Figure 4:
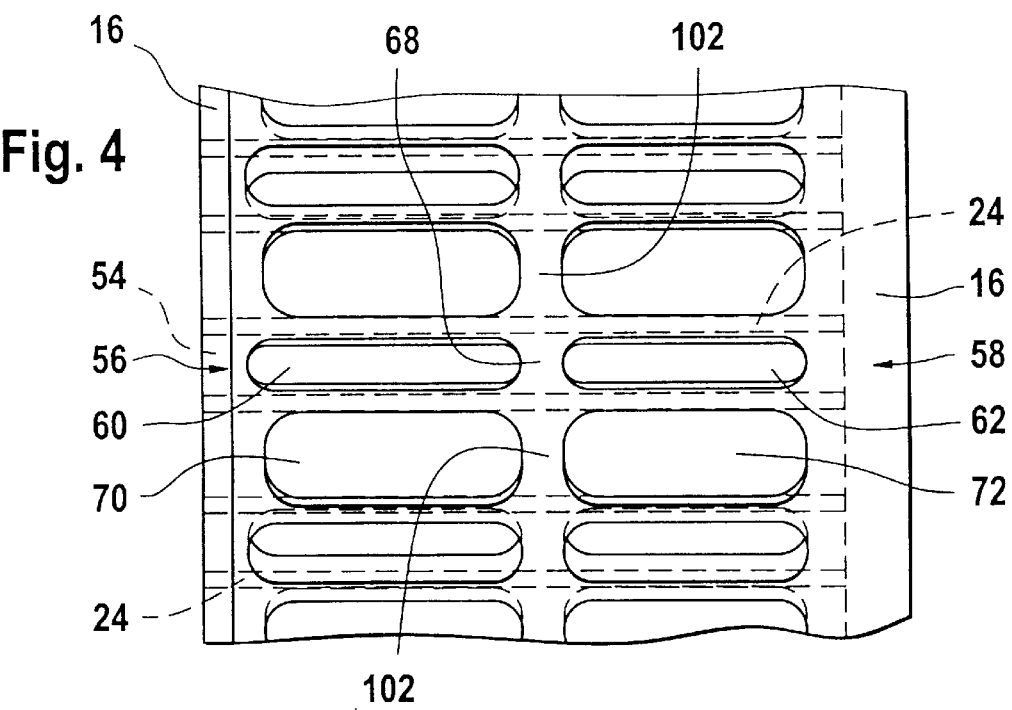
FIG. 4 is a view of the toothed ring radially from outside.
Figure 5:
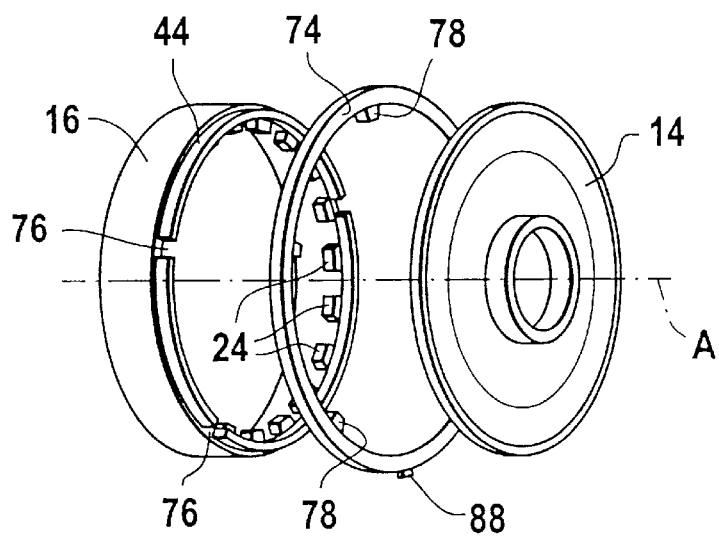
FIG. 5 is an exploded view of an alternative embodiment of a housing according to the invention.

FIGS. 3 and 4 show a preferred embodiment of the toothed ring 16 which can be used in the housing according to the invention. As can be seen in the sectional view in FIG. 3, the inwardly projecting multiplate driver teeth 24 are designed to be hollow, that is to say they have a cutout 54 which extends in the longitudinal direction and which preferably passes completely through these teeth. Furthermore, this cutout 54 is open radially to the outside at two axial areas 56, 58 through openings 60, 62, and is open radially to the inside through corresponding openings 64, 66. As can be seen in FIG. 4, a web 68 which runs around in the peripheral direction is thus formed between the areas 56, 58. In a corresponding way, openings 70, 72, between which, in turn, a web 102 is produced, are preferably formed in the areas 56, 58 between the individual teeth 24, which are shown dashed in the view of FIG. 4 since they are located on the inside of the toothed ring 16. The webs 102 and 68 thus alternate in the peripheral direction and form a continuous ring. The provision of these openings and, respectively, the at least partially hollow configuration of the teeth 24 means that the mass of the toothed ring 16 and thus the mass of the overall housing 12 can be reduced, so that the moment of inertia can also be reduced in a corresponding way. Furthermore, the openings make it possible for air to pass to the interior of the housing, so that during operation an excellent cooling action can be provided for the components which rub against one another.

It should be pointed out that it is not necessary for all the teeth 24 to be configured in this way, instead solid teeth can also be retained in order to increase the stiffness of the toothed ring 16.

FIGS. 5 to 8 show a further aspect of the present invention. It can be seen that a signal-generating ring 74 is integrated between the toothed rings 16 and the flywheel disk 14, and after the toothed ring 16 and flywheel disk 14 components have been connected, is firmly held on the housing 12. For this purpose, the toothed ring 16 has a number of cutouts or openings 76 at its axial end region 44 which are distributed in the peripheral direction and which, in the illustrated embodiment, are preferably each aligned in the peripheral direction with one of the teeth 24. It is pointed out that although in FIGS. 5 to 8 the teeth 24 are designed or illustrated as having only a limited axial extent, these can extend over the entire length of the toothed ring 16, as in the case of the arrangement described above. The cutouts 76 may be such that they extend at least partly into that tooth with which they are aligned. The signal-generating ring 74 has a securing projection 78 assigned to each cutout 76 which, when the signal-generating ring 74 is brought up axially to the toothed ring 16, enters the cutout 76 or, respectively, its extension in the associated tooth 24.

Figure 6:
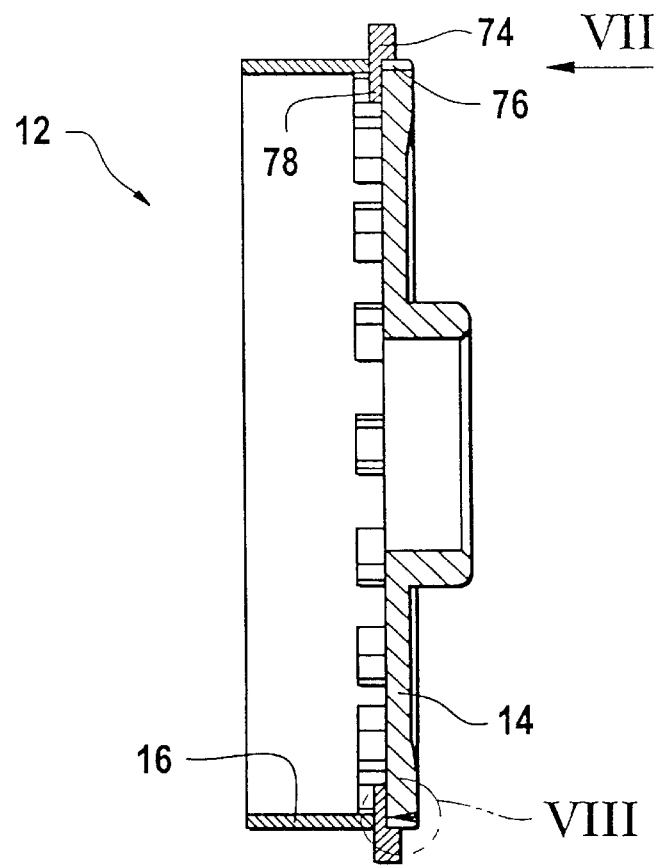
FIG. 6 is a longitudinal sectional view of the housing illustrated in exploded form in FIG. 5.
Figure 8:
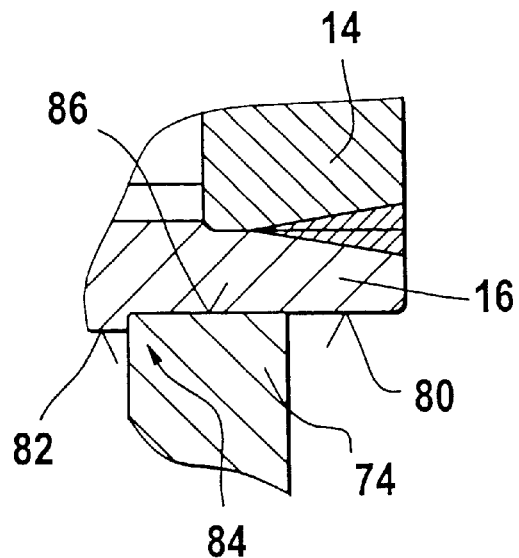
FIG. 8 is an enlarged detailed view of the section in FIG. 6 designated by the circle VIII.

As can be seen in particular in FIGS. 6 and 8, in the area of the end 44, the toothed ring 16 is designed to have a depression 80 on its outer peripheral surface 82, so that a radially directed stop shoulder 84 for the signal-generating ring 74 is formed. This means that the signal-generating ring 74, which is held in the radial direction by the firm force fit of its inner peripheral surface 86 on the depression 80, is held in the axial direction to the left in the illustration by the shoulder 84, on the one hand, and the securing projections 78, on the other hand. After the signal-generating ring 74 has been put onto the toothed ring 16, the flywheel disk 14 is then inserted into the toothed ring 16, as described above, specifically to such an extent that it abuts the securing projections 78 of the signal-generating ring 74 in the axial direction. After the connecting operation, for example the welding, the signal-generating ring 74 is then also fixed on the housing 12 in the other axial direction and can be finally machined with high accuracy e.g. by turning or the like.

The signal-generating ring 74 is used to generate signals for recording the rotational speed during rotational operation, in conjunction with a pick-up, for example a pickup coil. For this purpose, the signal-generating ring 74 has on its outer periphery at least one projection 88, which generates an electric pulse as it moves past the pick-up coil. For this purpose, the signal-generating ring 74 is formed of magnetic material. Since the signal-generating ring 74 is held on the housing 12 only by the clamping of the same between the toothed ring 16 and the flywheel disk 14, this signal-generating ring 74 can readily be formed from a different material from that of the toothed ring 16 and the flywheel disk 14, which can thus continue to be formed from titanium and be connected by welding. It should be pointed out that this integration of the signal-generating ring 74 into the housing 12 can also be retained if the flywheel disk and the toothed ring are connected to each other by bolts in the conventional way. It is also conceivable, in principle, to integrate the signal-generating ring 74 into the area in which the toothed ring 16 is connected to the cover 18.

Figure 7:
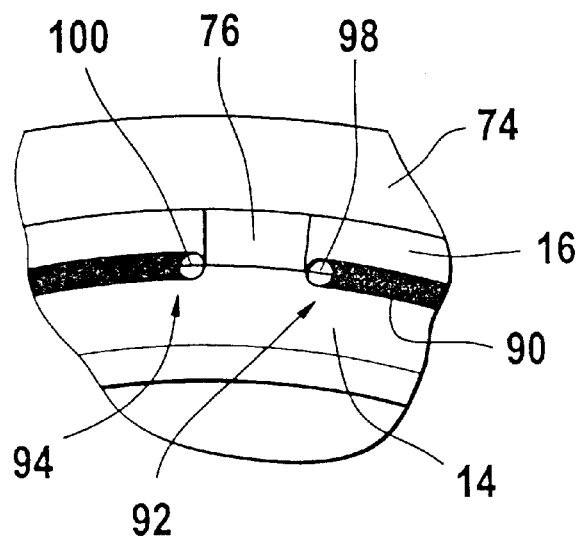
FIG. 7 is an enlarged axial view in the direction of view VII in FIG. 6.

Because of the provision of the axially open cutouts 76, when the welded connection is made between the flywheel (or cover) and toothed ring, an interruption is produced in the welded seam 90 drawn with a thick line in FIG. 7. In order not to produce any notch stresses at the ends 92, 94 of the welded seam 90, holes 98, 100 are provided at these ends. Holes 98, 100 cut into the welded seam and thereby produce a stress-free welded-seam end.

The magnetic action of the signal-generating ring is not impaired by the performance of an electric welding operation either, since this action is essentially shielded by the mutual arrangement of the toothed ring 16 and the flywheel disk 14.

As a result of constructing the housing of a multiplate clutch in accordance with the invention, considerable operating advantages are obtained with a reduction in the production costs. On the one hand, an increased connection strength and stiffening of the toothed ring are provided and, on the other hand, by leaving out components which are necessary in the prior art, namely the connecting screws for the housing components, the mass and hence the moment of inertia can be reduced. Furthermore, in the multiplate clutch according to the invention, or, respectively, its housing, a signal-generating ring for recording the rotational speed can be integrated without major constructional changes. It is therefore possible for the material of this ring to be selected irrespective of the material of the other components of the housing.

The invention is not limited by the embodiments described above which are presented as examples only but can be modified in various ways within the scope of protection defined by the appended patent claims.

We claim:

1. A housing for a motor vehicle multiplate clutch comprising:

a toothed ring having an inner peripheral surface, a first end, a second end and a plurality of multiplate driver teeth arranged on said inner peripheral surface and distributed in a peripheral direction, said multiple driver teeth extending in a ring longitudinal direction;

a flywheel disk connected to said first end of said toothed ring for common rotation therewith;

a cover connected to said second end of said toothed ring for common rotation therewith;

wherein at least one of said flywheel disk and said cover are connected to said toothed ring by welding, said welding being performed by one of electron beam welding and laser welding methods; and a signal generating ring secured in the housing between said toothed ring and said at least one of the flywheel disk and the cover, wherein at least one portion of said signal generating ring is in a positive fitting engagement with said toothed ring such that said signal generating ring is in a fixed rotary position relative to said toothed ring.

2. The housing in accordance with claim 1, wherein said welded connection extends over an entire peripheral area of the housing.

3. The housing in accordance with claim 1, wherein said at least one of the flywheel disk and the cover and said toothed ring comprise the same material.

4. The housing in accordance with claim 3, wherein said same material comprises titanium.

5. The housing in accordance with claim 1, wherein at least one of said plurality of mutliplate driver teeth comprise a cutout penetrating said teeth in the ring longitudinal direction.

6. The housing in accordance with claim 5, wherein said cutout is radially open to the outside of the housing.

7. The housing in accordance with claim 5, wherein said cutout is radially open to the inside of the housing.

8. The housing in accordance with claim 5, wherin said cutout is radially open to the outside and inside of the housing.

9. The housing in accordance with claim 1, wherein said at least one of the flywheel disk and the cover is fitted into said toothed ring and comprises an outer peripheral surface, said outer peripheral surface being welded to said inner peripheral surface of said toothed ring.

10. The housing in accordance with claim 1, wherein said toothed ring further comprises a securing cutout axially open, and said signal-generating ring further comprises at least one securing projection projecting radially inward, said at least one securing projection engaging said securing cutout.

11. The housing in accordance with claim 10, wherein said securing cutout is aligned the peripheral direction with at least one of said plurality of multiplate driver teeth, said at least one securing projection having a shape corresponding to a shape of said at least one of said plurality of multiplate driver teeth.

12. The housing in accordance with claim 10, wherein said securing cutout is aligned in the peripheral direction with one of said plurality of multiplate driver teeth and extends into said one tooth, said at least one securing projection having a shape corresponding to a shape of said cutout produced in said one tooth.

13. The housing in accordance with claim 10, wherein said welded connection between said toothed ring and said one of the flywheel disk and the cover is interrupted in the area of said securing cutout, said welded connection comprising a relief hole cut into the welded connection in at least one end of said welded connection.

14. The housing in accordance with claim 1, wherein said toothed ring further comprises an outer peripheral surface, said signal-generating ring being fit onto said outer peripheral surface.

15. The housing in accordance with claim 1, wherein said signal-generating ring is formed from a material different than that of said toothed ring and said at least one of the flywheel disk and the cover.

16. The housing in accordance with claim 1, wherein said signal-generating ring is formed from a magnetic material.

17. A method of producing a housing of a multiplate clutch comprising the steps of, arranging a signal-generating ring between a toothed ring and one of a flywheel disk and a cover so that at least a portion of the signal-generating ring is in a positive locked arrangement with the toothed ring and connecting the toothed ring to the one of a flywheel disk and a cover by welding, said welding being one selected from a group consisting of electron beam welding and laser welding.

* * * * *